Sept. 19, 1967 D. ROSE 3,342,336
WATER CONDITIONER HAVING REGENERATION MEANS
Filed Oct. 7, 1963 7 Sheets-Sheet 1

INVENTOR
DONALD ROSE
BY Beale and Jones
ATTORNEYS

Sept. 19, 1967   D. ROSE   3,342,336
WATER CONDITIONER HAVING REGENERATION MEANS
Filed Oct. 7, 1963   7 Sheets-Sheet 4

INVENTOR
DONALD ROSE
BY Beale and Jones
ATTORNEYS

INVENTOR
DONALD ROSE

INVENTOR
DONALD ROSE
BY Beale and Jones
ATTORNEYS

# United States Patent Office 3,342,336
Patented Sept. 19, 1967

3,342,336
WATER CONDITIONER HAVING
REGENERATION MEANS
Donald Rose, Dayton, Ohio, assignor to Water Refining
Company, Inc., Middletown, Ohio, a corporation of
Ohio
Filed Oct. 7, 1963, Ser. No. 314,130
3 Claims. (Cl. 210—134)

This invention is directed to improvements in water conditioner apparatus.

A full system of water conditioning may not be justified or desired in certain instances and areas where the water is hard and needs further treating to remove turbity and possible iron in solution, yet the advantages of a water conditioner may be desired. It is in such instances that this invention provides for conditioning the water for such uses.

It is an object of my invention to provide a water conditioner for use with washing machines and separate apparatus where conditioned water is desirable or required.

Another object of my invention is to provide a water conditioner that may be used in conjunction with a washing machine and in which the mineral in the water conditioner is reconditioned during the washing of a batch of clothes or dishes in case of a dish washer.

A still further object of my invention is to provide a water conditioner in conjunction with a washing machine wherein for each batch of washing, a small quantity of regeneration material, such as salt, is introduced into a container for subsequent dissolving and rehabilitation of a mineral bed and at the same time the operator introduces a detergent or soap but in a smaller quantity than usual without the benefit of a water conditioner, said soap being introduced in another container.

Yet a still further object of the invention is to obtain the benefit of a water conditioner and at the same time save on the amount of soap or detergent usually required in use of the washing machine.

A further object of the invention is to provide a water conditioner in conjunction with a washing machine that will handle highly turbid and iron bearing waters.

A still further object of the invention is to provide in a water conditioner of the relatively small type for batch water reconditioning, a fast rinse cycle for reconditioning the mineral bed of the conditioner whereby the mineral bed is reset, cleared of any iron and turbidity in suspension and all regeneration material pockets remaining are removed to provide for immediate fully reconditioned water on next use of the conditioner for furnishing conditioned water.

A further object of the invention is to provide in a water conditioner a regenerate container system for a periodic single reconditioning that traps a charge of air so that on reconditioning the charge of air is applied to the mineral bed to break up and separate the mineral therein for more effective regeneration of the same and all solution is drawn from the regenerate container leaving the container ready for reuse.

A still further object of the invention is to provide a water conditioner for a washing machine or the like having a program timer wherein the same timer may be adapted to be used for operating the water conditioner for such machine.

Another object of the invention is to provide a water conditioner of the relatively small type for use with such apparatus as drinking fountains, coffee and soft drink dispensers, washing machines and isolated separate use conditioned water supply requirements.

Yet a further object of the invention is to provide in a batch type water conditioner where use is made of a regenerate container for single fill and emptying for reconditioning, a pressure relief protection for the regenerate container.

For a more complete understanding of the nature and scope of the invention reference is had to the drawings in which.

Throughout the description like reference numbers refer to similar parts.

Figure 1:
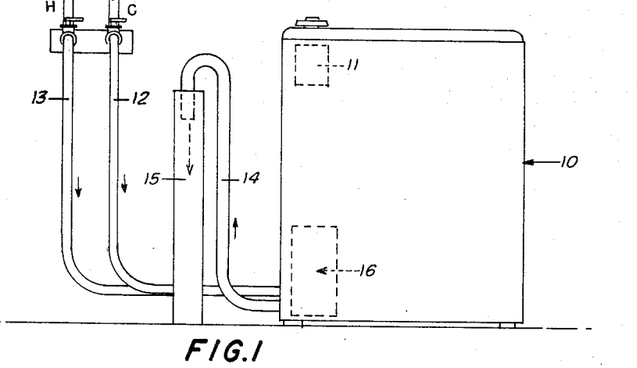
FIG. 1 is a schematic elevational view of an automatic washing machine having a water conditioner according to the invention incorporated therein.

A washing machine of the automatic type is indicated at 10 having a timer 11 and conventional hose leads 12 and 13 to the cold and hot water of the house connections and a flexible drain line 14 leading to a typical drain pipe 15.

The water softener and conditioner hereinafter referred to as water softener is indicated generally at 16 and is incorporated within the housing of the washing machine 10.

Figures 2, 21:
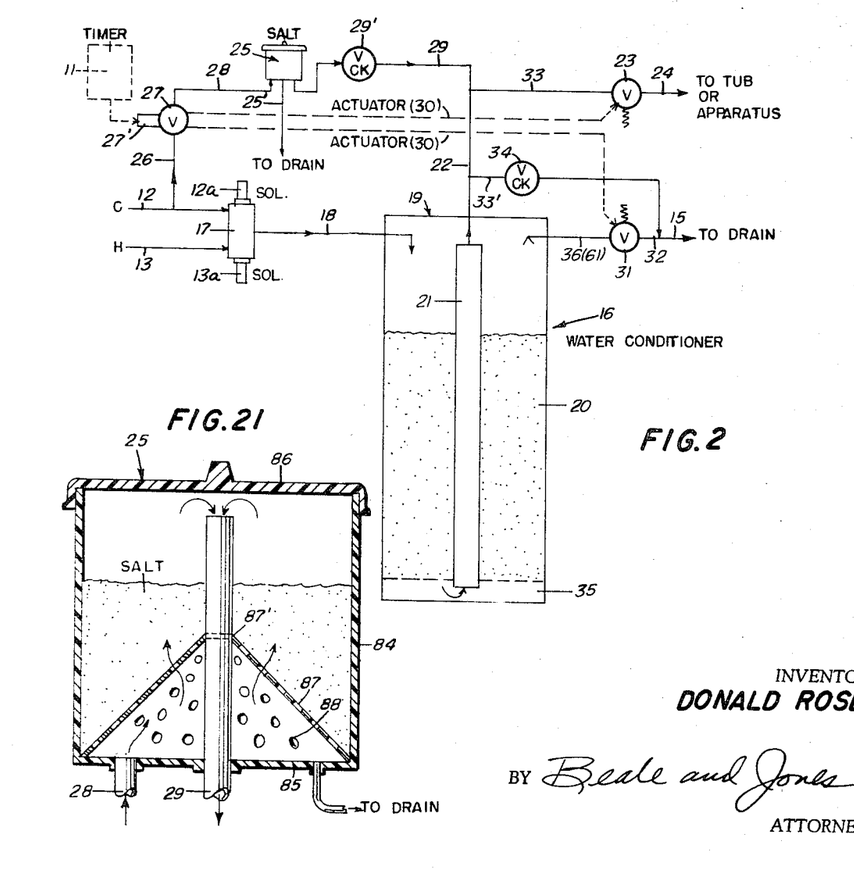
FIG. 2 is a schematic line drawing of the water conditioner incorporated within the washing machine shown in FIG. 1.
FIG. 21 is an enlarged cross sectional view of the regenerate container shown in FIG. 2.

Reference to FIG. 2 shows a schematic arrangement of the connections of the water softener to the tub and drain of the washing machine 10 as well as to the mixing valve within the washing machine 10. The mixing valve 17 as shown in FIG. 2 is connected to the cold and hot water lines 12 and 13 and is located within the housing of the washing machine 10 and operated by solenoids 12a and 13a under control of the timer 11. The discharge from the mixing valve 17 is to a conduit 18 leading to the top or head assembly 19 of the water softener 16. If a flow control valve is not incorporated in the mixer valve 17 to insure for variable water pressure for a given time a desired amount of water, a flow control valve can be incorporated in the head assembly 19 to be described. The water to be conditioned passes down through a mineral bed 20 and up through a stand pipe 21 to a discharge conduit 22 and through a diaphragm actuated valve 23 in line 24 to furnish conditioned water to the tub of the washing machine 10.

By way of explanation before describing the details of the water softener, in order to recondition the mineral bed 20 during the washing of a batch of clothes in the washing machine 10 there is provided a small salt container 25 which will hold a relatively small amount of salt sufficient for reconditioning the mineral 20 in softener 16. For example, where about 20 grain hardness water is being handled it would take about ½ cup of salt to recondition the mineral in a conditioner for conditioning about 50 to 60 gallons of water per conditioning. A conduit 26 is directly connected to the cold water supply conduit 12 which has therein solenoid actuated control valve 27 which discharges through conduit 28 to the salt container 25 which further discharges to a conduit 29 which may have a check valve 29' therein to prevent backflow through the salt container 25. Conduit 29 is connected with discharge conduit 22 of the softener 16 previously described. When valve 27 is actuated it applies house water pressure to a diaphragm 30, see FIG. 5, and this is termed the "actuator" shown in parentheses 30 in FIG. 2 to actuate the water pressure diaphragm actuator valve 23 in line 24 and the spring loaded drain valve 31 in a drain line 32 leading from the head assembly 19 of the water softener 16 to drain 15. In the schematic shown in FIG. 2, a conduit 33' having a spring loaded pressure relief and fast rinse drain valve 34 therein connects the conduit 22 with the downstream side of conduit 32 from valve 31.

Figure 5:
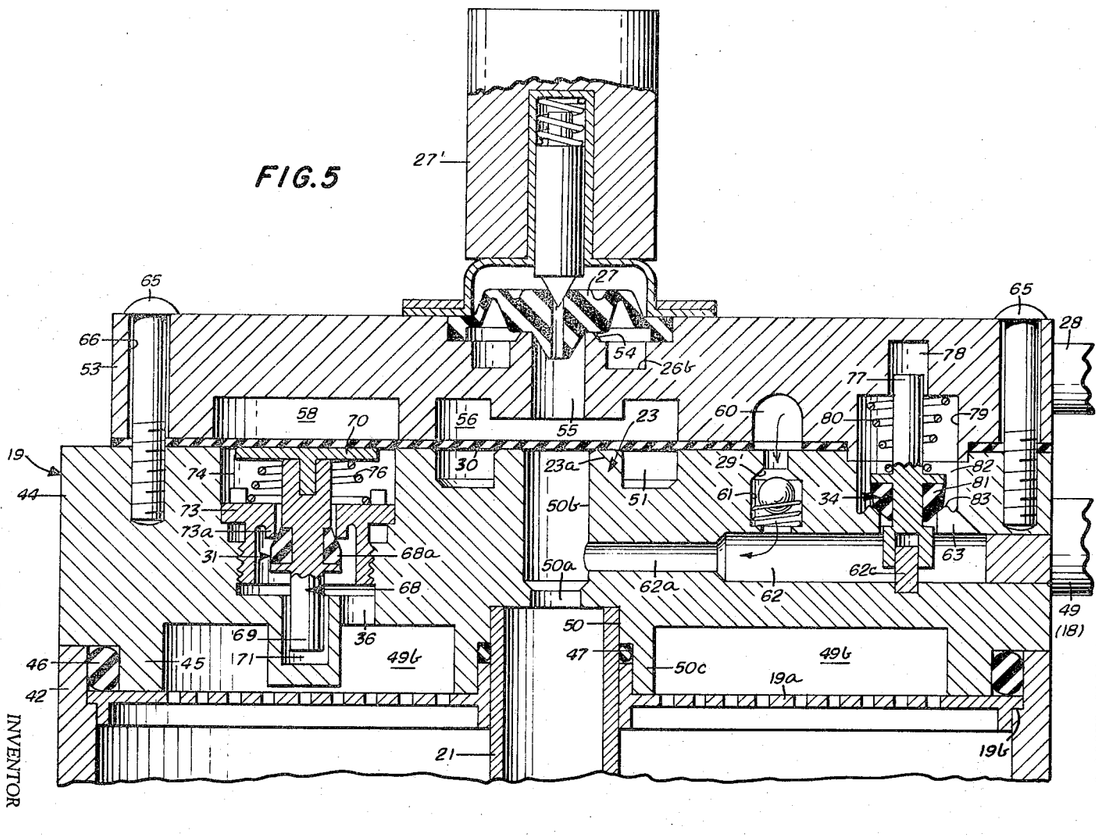
FIG. 5 is a side elevational view along section line 5—5 of FIG. 4 showing the upper end of the water conditioner on an enlarged scale, the bottom portion of container 40 being broken off.

To carry out the reconditioning of the mineral bed 20 while a batch of clothes is being washed and while the control valve 17 is closed, the timer washer 11 has suitable contacts thereon to actuate the solenoid 27' of valve 27 which when actuated permits opening of valve 27 and permits water pressure from the cold water supply line 12 to push down the diaphragm 30, see FIG. 5, to actuate valve 23 to closed position, this cuts off the connection from the stand pipe 21 to the tub. The cold water passes through valve 27, conduit 28, salt container 25, where it moves out a trapped charge of air and dissolves a small batch of salt therein for one reconditioning, moves the charge of air and regenerate solution, through check valve 29', conduit 29, and being at a relatively lower pressure than the supply water, down to conduit 22 and not opening spring loaded pressure relief, fast rinse drain valve 34 in conduit 23. The conduit 28 has pressure reduction passages therein as will be described to reduce the pressure which is not sufficient to open fast rinse, pressure relief drain valve 34. The water passing down through conduit 22 goes into stand pipe 21 downward therethrough to the bottom distributor chamber 35 and up through the mineral bed 20 where the charged trapped air from container 25 breaks up the mineral bed. The regenerate solution followed by slow rinse flow not only reconditions the mineral but also backwashes same and flows through suitable passageways in the head assembly 19, to be described, out conduit 36, through spring loaded drain valve 31, and thence through conduit 32 to drain 15. Following the dissolving of the salt in the container 25 and expulsion therefrom, the flow continues to permit a slow rinse of the minerals 20. The minerals have been expanded by this reconditioning or brining or backwash by about 40% but without loss of minerals by carryover.

To carry out the fast rinse the solenoid actuated operating valve holds valve 27 open and the control valve 17 is actuated to permit a flow of supply water through conduit 18 to the proper head assembly portion 19 for softener or conditioner 16. The fast rinse flows through the mineral bed setting same and washing out any pockets of turbidity and salt. The fast rinse down through the mineral bed 20 is at approximately one-half the rate of water flow through the control valve 17 to reset the bed 20. The drain at the bottom of the softener 35 passes up through stand pipe 21 and is of sufficient pressure to open spring loaded pressure relief, fast rinse drain valve 34 in conduit 33 which drains to the downstream portion of conduit 32 as shown in FIG. 2, thence to drain 15. This fast rinse is essential in such water conditioners to remove any regenerate solution pockets and turbidity pockets in the container 40 and mineral bed as such would be detrimental if the water being supplied by the conditioner carried any of this over.

The amount of water and pressure is such that during the fast rinse water flushes salt container 25, through check valve 29' into the conduit 22 and out through valve 34 in conduit 33' and also to drain 15. The fast flow of water through the conduits 36 and 32 on fast rinse prevents pressure buildup in the conduit 29 as illustrated in FIG. 2. When the fast rinse is accomplished and valve 27 closes a vacuum is placed on the salt container 25 on the service cycle when conditioned water flows out through conduit 33 and past valve 23. However, a recharge of trapped air accumulates in container 25.

The details of the head assembly 19 and its passages in the water softener will be described and the flow and passages for the various phases of the water softener operation will be described with respect to FIG. 5 through FIG. 20 inclusive and FIG. 23. Before the flow and operation is described for the softener shown in FIGS. 5 through 20 inclusive, the structure will be described.

The water softener generally shown at 16 is shown here as a cylindrical container 40 having a closed bottom end 41 and an open top end 42. A suitable perforated distributor plate 43 is mounted in the bottom having a central upstanding neck 43a which communicates with an integral collar 41a in bottom 41 having transversely extending passages 41b therein.

The head assembly 19 is seated in the top end 42 and there is an apertured distributor plate 19a which fits over the upper end of the stand pipe 21 protruding therethrough and rests at its periphery 19b on a ledge at the top end 42 of the water softener body 40.

Figure 3:
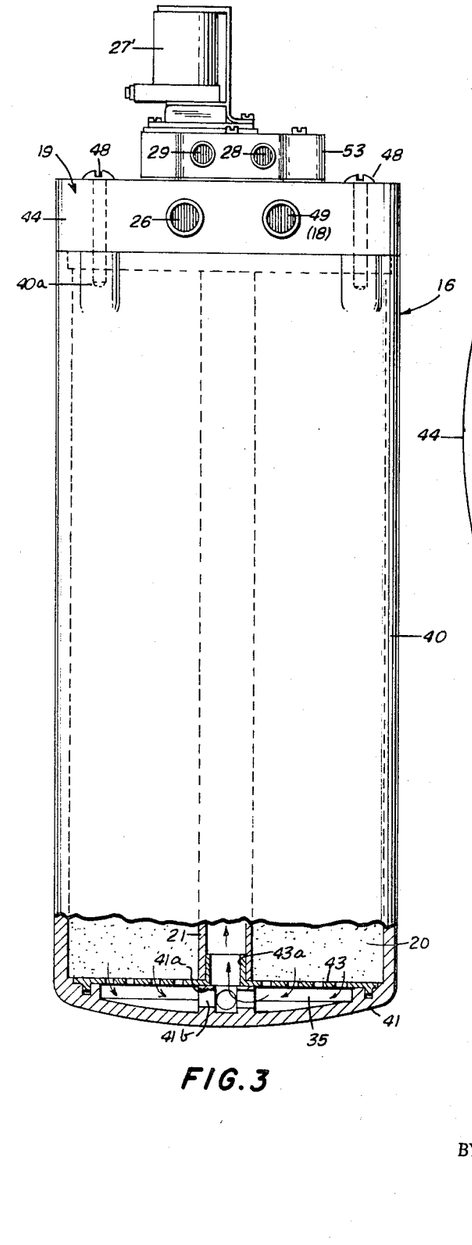
FIG. 3 is a side elevation of the water conditioner on a relatively small scale and broken away to show the bottom distributor portion.
Figure 4:
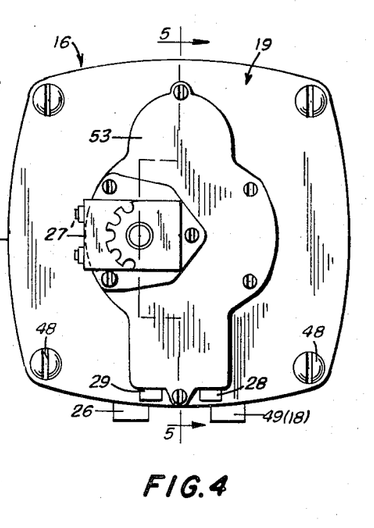
FIG. 4 is a top plan view of the water conditioner shown in FIG. 3.

A cylindrical block 44 which forms the bottom portion of the head assembly 19 has a reduced diameter lower annular portion 45 which fits into the open end 42 of the container 40 and seals therewith by an O-ring 46. The bottom portion 44, of the head assembly 19 is held on container 40 by securing screws 48 which are received in threaded lug portions 40a at the top portion of the container 40, see FIG. 3, to hold the cylindrical block portion 44 in assembled position on container 40. This cylindrical block 44 houses the valves 23, 31 and 34.

FIGS. 6–13, showing the bottom of the head assembly 19, and FIGS. 14–20, showing the top of the head assembly 19, are now described. The block 44, the bottom portion of head assembly 19, has a hard water inlet 49 connecting with a 45° angle passage 49a, see FIG. 13, leading to annular passage 49b in the bottom thereof. A central passage 50 formed by a depending annular wall 50c leads to a restricted aperture 50a thereabove and thence to a top passage 50b of intermediate diameter as between the diameter of 50 and 50a. The annular wall 50c receives the upper end of stand pipe 21. This top passage 50b communicates with valve 23 formed by the diaphragm 30 seating on upstanding annular wall 23a. The valve 23 connects vertical passage 50b with an annular surrounding cavity 51 in the top of 44. Cavity 51 connects by a side passageway 51a with a passageway 52 leading to the washing machine tub or device to furnish conditioned water thereto when operating under the service cycle with valve 17 actuated and the valve 27 is closed whereupon valve 23 is open to pass conditioned water therethrough.

Figure 6:
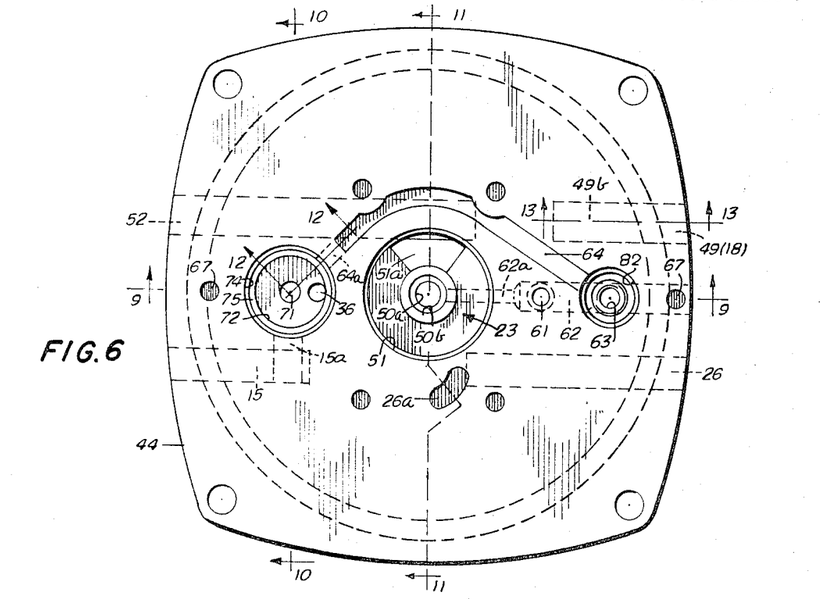
FIG. 6 is a to plan view on a different scale of the bottom portion of the head assembly of the water conditioner.
Figure 7:
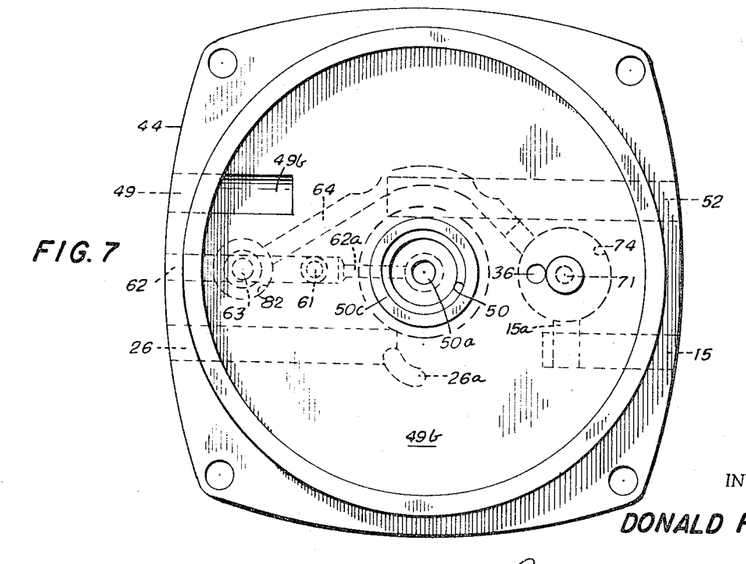
FIG. 7 is a bottom plan view of the bottom portion of the head assembly shown in FIG. 6.
Figure 8:
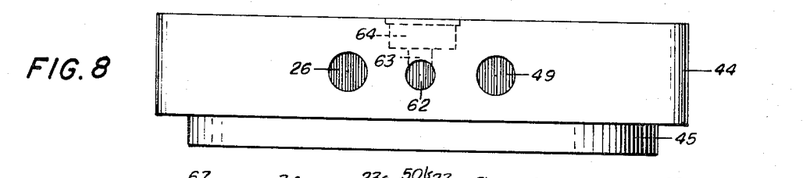
FIG. 8 is a right side elevational view of the bottom portion of the head assembly shown in FIG. 6.
Figure 9:
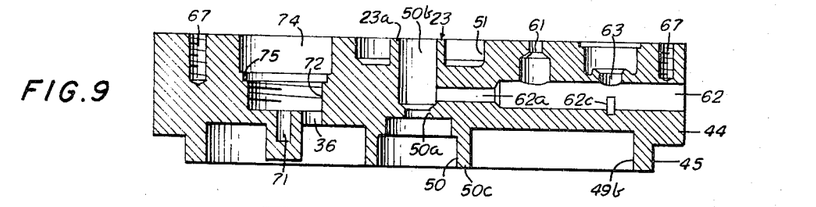
FIG. 9 is a sectional view along the line 9—9 of the head assembly portion in FIG. 6.
Figure 9A:
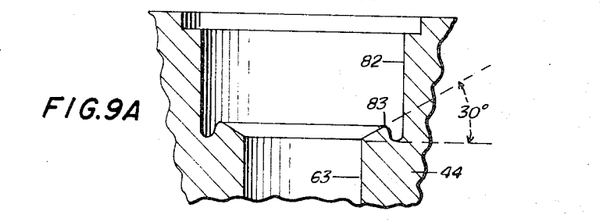
FIG. 9A is an enlarged fragmentary view of the valve seat portion in the head assembly portion in FIG. 9.
Figure 10:
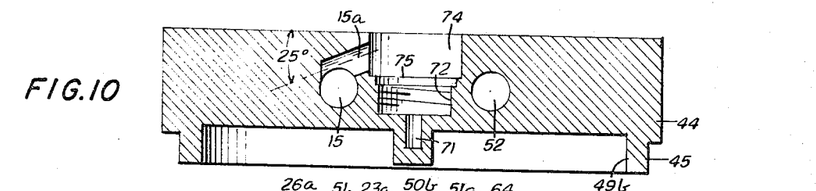
FIG. 10 is a sectional view of the head assembly portion on line 10—10 of FIG. 6.
Figure 11:
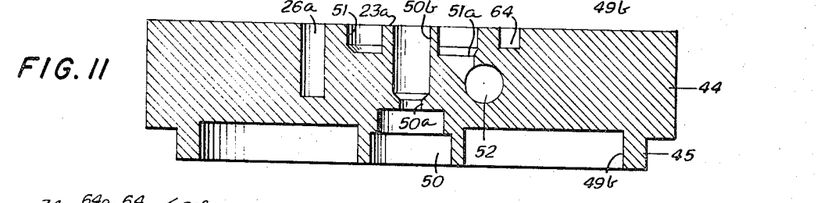
FIG. 11 is a vertical sectional view along line 11—11 in FIG. 6.
Figures 12, 13:
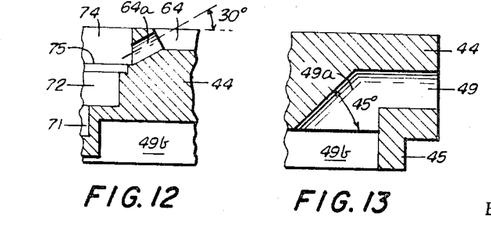
FIG. 12 is a sectional view along line 12—12 of FIG. 6.
FIG. 13 is a sectional view along line 13—13 of FIG. 6.
Figure 14:
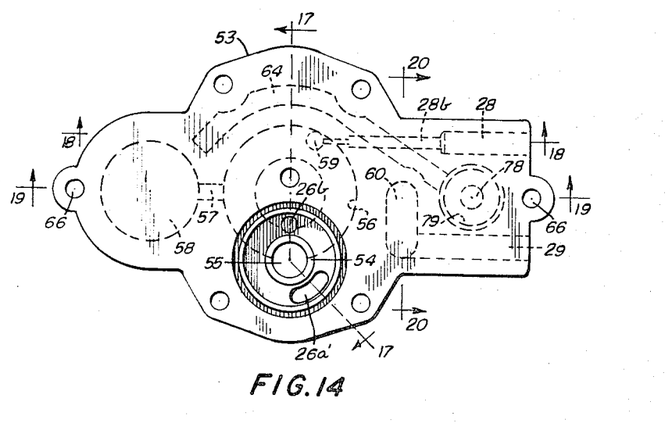
FIG. 14 is a top plan view of the top portion of the head assembly of the water conditioner shown in FIG. 5.
Figure 15:
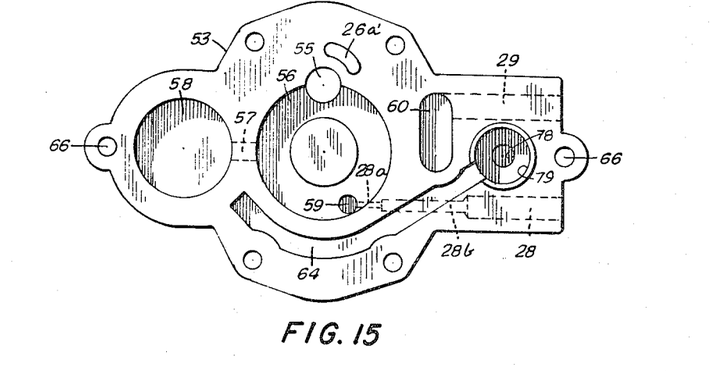
FIG. 15 is a bottom plan view of the bottom portion of the head assembly shown in FIG. 14.
Figure 16:
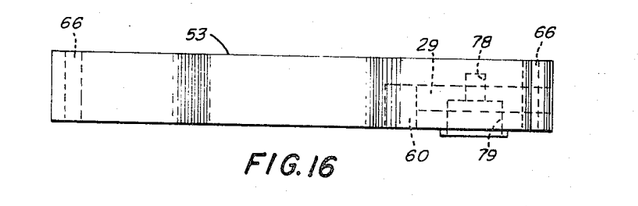
FIG. 16 is a front elevational view of the head assembly portion shown in FIG. 14.
Figure 17:
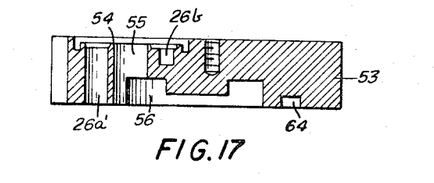
FIG. 17 is a sectional view along line 17—17 of FIG. 14.
Figure 18:
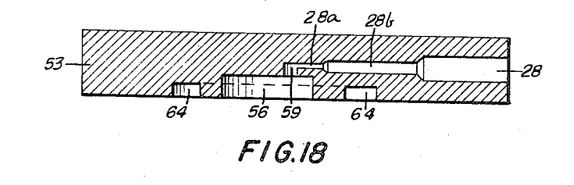
FIG. 18 is a sectional view along line 18—18 of FIG. 14.
Figure 19:
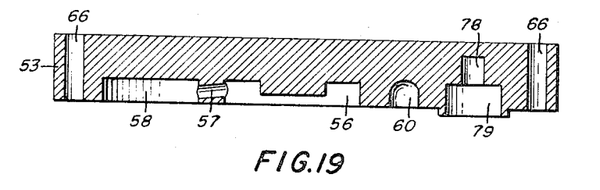
FIG. 19 is a sectional view along line 19—19 of FIG. 14.

Supply water enters branch 26, see FIGS. 6, 8 and 11, passes through a vertical passage 26a which communicates with a like vertical passage 26a' in the upper member 53 of head assembly 19, thence to annular passage 26b in top member 53, see FIGS. 14, 15 and 17. When the solenoid 27' of valve 27 is energized by the timer, supply water passes the diaphragm of valve 27 down through vertical passage 55, into annular passage 56 above diaphragm gasket 30 and seats gasket 30 on the annular cooperating shoulder 23a therebeneath of valve 23. Annular passage 56 feeds pressure supply water by horizontal passage 57 to pressure chamber 58 above drain valve 31 to open it against its spring. The annular passage 56 also feeds supply water to the salt container inlet conduit 28 through a vertical passage 59, to a reduced in diameter passage 28a, a little larger passage 28b, and thence into passage 28 on to the salt container 25. The reduced size passages 28a and 28b reduce the pressure applied to container 25.

Figure 20:
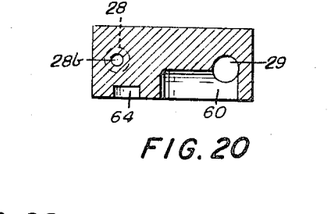
FIG. 20 is a sectional view along line 20—20 of FIG. 14.

Solution and a trapped amount of air from salt container 25 goes to the valve head assembly 19 through conduit and passage 29, see FIG. 20, to a transverse chamber 60, see FIGS. 5 and 20, down through a vertical passage 61, in bottom head member 44. Passage 61 communicates with a horizontal passage 62 in bottom member 44. In the left hand end of passage 62 is a reduced in diameter portion 62a which communicates with vertical passage 50b that is in communication with the stand pipe 21. The reduced in diameter portion 62a also provides for a reduced pressure for slow brining following which is a slow rinse. The trapped air, brine and slow rinse water pass down through stand pipe 21, through bottom distributor chamber 35, up through the mineral bed 21 where breaking up of the mineral bed, backwashing, brining and slow rinse of the mineral bed occurs, out through annular passage 49b in head portion 44, up through the relatively small diameter vertical drain passage 36, through valve 31, chamber 74, passage 15a and on to drain line 15.

During a fast rinse both valves 27 and 17 are open and valve 23 of course is closed since the diaphragm 30 is pressurized on its top closing valve 23. Supply water passes down through the distributor 19a, down through the mineral bed to fast rinse it, set it and to remove turbidity and any salt pockets. The fast rinse water passes up stand pipe 21, through reduced passage 50a, through horizontal passages 62a and 62 and through upwardly extending passage 63 where its pressure raises spring loaded drain, pressure relief valve 34, thence through passage 64, see FIGS. 6 and 7, through passage 64a, see FIG. 12, to drain chamber 74 and by drain valve 31 to drain 15, see FIG. 5. The water flowing through valve 27, the salt container 25 also passes out through the passage 61 past check valve 29' and valve 34 to drain. A small diameter drain conduit 25' leads from the bottom of the salt container to drain 15 to insure that the salt container is drained. This bleed off drain line 25' is always open and is relatively small so that there is not much loss yet there is a pocket of air trapped in container 25 for each regeneration cycle.

Valve 27 is of the type of valve shown in applicant's U.S. Patent 3,044,626, issued July 17, 1962, as at 224 and 254 in that patent.

The top portion 53 of the head assembly 19 is secured to the bottom portion 44 by suitable screws 65 passing through apertures 66 and 53 and threadedly received in threaded apertures 67 in member 44. A suitable gasket may be utilized between the top member 53 and the received top of member 44, the bottom member of the head assembly 19.

The spring loaded drain valve 31 has a two part stem 68 with lower portion 69 and a top portion 70. The bottom portion 69 of the two part stem 68 is reciprocably received in a pocket 71, see FIG. 9, in member 44. Directly above the pocket 71 is a threaded circular recess 72 to receive the body portion 73 of valve 31 through which lower portion 69 extends in a reciprocable manner. The threaded recess 72 communicates with an enlarged circular cavity 74 thereabove and forms a shoulder 75 therewith upon which an enlarged portion on body member 73 rests. A compression spring 76 is disposed between parts 69 and 70 of valve stem 68. Body 73 has a seat 73a in its lower portion against which a composition valve portion 68a seats. The parts 69 and 70 of the valve stem 68 are made fast together in assembly so that the valve stem 68 moves as a unit.

Pressure relief, fast rinse drain valve 34 has a vertically disposed stem 77 reciprocably received at its upper end in a vertical pocket 78 in the top member 53. Below the pocket 78 in member 53 is an enlarged circular recess 79 within which is received a compression spring 80 which rides against a transverse portion on stem 77 to hold a composition valve portion 81 on stem 77 that is housed within a pocket 82 in member 44 against a valve seat 83, see FIG. 9A. Reference to FIG. 5 shows that the body member 44 is cut away at 63, forming an upwardly extending passage, so that the water pressure in passage 62 may act on the valve portion 81 of valve 34. In FIG. 5 a guide member 62c in passage 62 extends upward as a guide for a recess in the bottom of the stem 77 of valve 34.

The sequence of cycles in the use of the water conditioner will now be described as respects the more detailed description given above.

In FIG. 21 is shown the arrangement of the regenerate container 25. This container has a hollow body portion 84 with a bottom 85 and an open top which receives in air and water tight relationship as easily installed and removed lid 86. The lid 86 may be screw threaded onto body 84. Conduit 28 leads through the bottom to supply water while the outlet conduit 29 extends up through the bottom 85 in spaced relation to the lid as a stand pipe. An upwardly extending cone-shaped perforated element 87 has an upwardly extending central apex aperture 87' received over the conduit 29 and the regenerate material is received thereon for dissolving with the water percolating upward therethrough. An air pocket space is left below the cone 87 at 88 and each time a salt charge is dissolved, the trapped air in pocket 88 is forced upward and out the stand pipe portion 29 and to the mineral bed, as described, to break up the mineral bed for better regeneration.

SERVICE CYCLE (1) Control valve 17 of washer opens.

(2) Water flows through valve 17 through supply line 18 and into passage 49 and into the annular space 49b above the distributor 19a. It passes down through the mineral bed 20, through the bottom distributor 43, bottom distributor space 35 and up through the stand pipe 21, under the gasket 30 of valve 23 to annular portion 51, through 51a, to passage 52 and through conduit 24 to the tub of the washer.

The flow through reduced portion or port 50a will cause pressure loss and prevent pressure build up in the salt container 25 and the conduits leading therefrom. When the water passes through the conditioner, the salt container will empty itself of unconditioned water to insure there is sufficient space for reloading of salt. The bleed off drain 25' from the container 25 also insures complete emptying for refill.

The salt container is protected against high pressure by the action of the spring loaded pressure relief, fast rinse drain valve 34.

REGENERATION CYCLE

This regeneration cycle includes brining, backwash and slow rinse.

(1) Brining, backwash and slow rinse is in the opposite direction of service flow or water conditioning.

(2) The control valve 17 is off. The solenoid to valve 27 is energized. These valves are both controlled by the washer program timer 11 or by a separate control device.

(3) Water supply flows through conduit 26, up through 26a, 26a', annular cavity 26b through valve 27 to vertical passage 55, passage 59, passages 28a, 28b and to conduit 28 to the salt container 25. From salt container 25, through 29, cavity 60, passage 61, passages 62 and 62a to vertical cavity 50b and downward through port 50a and into the top of stand pipe 21 and down to the distributor chamber 35 and up through the mineral bed 20, through the top distributor 19a and annular chamber 49b, up through passage 36 and through drain valve 31, passage 15a and to drain 15.

Water pressure from solenoid actuated valve 27 forces the gasket 30 downward sealing off the discharge valve 23. This pressure also pressurizes the drain valve 31 forcing it open. The water flows through small ports 28a and 28b, see FIG. 18, through conduit 28 to the salt container, through the salt container 25, forcing out through 29 the entrapped air, dissolving the salt, and into passage 29 and thence to the stand pipe and up through the mineral bed and out to drain as explained above. After the salt is dissolved and the solution has been forced out of the container, the water will start rinsing salt out of the mineral bed 20. This cycle of regeneration will take approximately four (4) minutes.

FAST RINSE (1) The control valve 17 is energized.

(2) Solenoid actuated valve 27 is energized.

(3) The supply water flows through 18 to inlet 49 of the head assembly, down through the distributor 19a, through the mineral bed 20, through the bottom distributor 43, area 35, up through stand pipe 21, through port 50a, passages 50b, 62a, 62, opening valve 34 by the fast rinse pressure acting thereon, through valve 34 and through passages 64, area 74 and out through 15a to drain 15.

The amount of water and pressure during Fast Rinse forces water from salt container 25 to discharge into vertical passage 61 and passage 62 and through fast rinse drain valve 34.

The water pressure in cavity 74 plus the load of spring 76 on drain valve 31 will tend to overcome pressure on top of gasket 30 in the area thereabove in chamber 58. If drain valve 31 does not close due to extreme high pressure on gasket 30 in chamber 58, there will be a slight waste of water during the fast rinse cycle.

The Fast Rinse water flow rate through the mineral bed will be approximately one-half the rate of water flow through the control valve 17. This rate of Fast Rinse will be about two times the flow rate required to expand the mineral bed about 40%.

MODIFICATION

Figure 22:
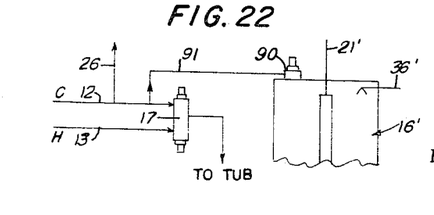
FIG. 22 is a partial schematic view similar to FIG. 1 showing a separate water supply valve in the water conditioner as an alternative.

The water conditioner may have, as shown in FIG. 22, a separate control valve 90 incorporated in the head assembly 19 to receive water for the service cycle and fast rinsing from supply line 12 by a branch line 91. This would dispense with the supply from the mixing valve 17. The discharge from the mixing valve 17 would then go directly to tub or place of use. A separate timer element or timer could be used when the conditioner is used by itself to furnish conditioned water for various purposes.

Figure 23:
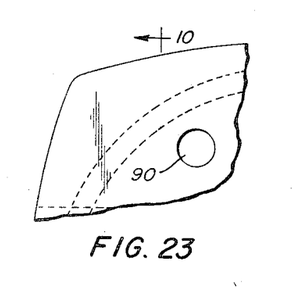
FIG. 23 is a fragmentary top plan view of the bottom portion of the head shown in FIG. 6 with a passage to receive a separate control valve.

In FIG. 23 a position for a supply passage from valve 90 to the top distributor 19a is shown by the broken circle 90'. A valve similar to 27 could be used as valve 90 and it would furnish supply water to the water conditioner for service and fast rinse.

The modification would permit the water conditioner to be self contained and not dependent on the mixing valve 17. The salt container 25 could be placed in an accessible place for loading in both instances. This self contained water conditioner is a highly useful conditioner to supply a relatively small batch amount of conditioned water periodically.

The mixer valve 17 could, if desired, be built into the head assembly as pointed out for the separate control valve 88 modification.

I claim as my invention:

1. A water conditioner having a housing means having a mineral bed therein for service conditioning water and providing a supply thereof, supply conduit and inlet valve means connected to said housing means and adapted to deliver water for service conditioning to said housing means and through the mineral bed, a discharge conduit means having pressure reduction means therein leading from said mineral bed housing to conduct conditioned water from said bed and housing means, a timer means, a container for a regeneration agent sufficient for a single regeneration of said mineral bed, water supply conduit means having pressure reduction means and a second valve means therein connecting said supply conduit inlet valve means with said regeneration container for supplying water thereto, conduit means having pressure reduction means therein connecting the regeneration container with the discharge conduit means leading from the mineral bed housing for a reverse flow therethrough to that of the service flow for supplying the regeneration agent at reduced pressure to the mineral bed for regenerating and backwashing the same, following said introduction of regeneration agent water continuing to flow through said regeneration container to flush same and to slow rinse said bed, the discharge conduit means leading from said mineral bed having its pressure reduction means therein so as to cause pressure loss and prevent pressure build up in said regeneration container and the conduit leading therefrom, drain means having a third valve having diaphragm actuation means connected with said mineral bed housing to remove regenerating fluid and slow rinse water therefrom, conduit means having pressure reduction means therein leading from the mineral bed housing and having fourth valve means therein including diaphragm actuating means for shutting off service flow from said mineral bed housing, means responsive to said second valve opening acting on said third valve diaphragm actuating means to open said third valve to drain and acting on said fourth valve diaphragm actuating means to close said fourth valve means, a discharge conduit means connecting said discharge conduit means from the mineral bed to discharge fast rinse water therethrough to a drain and having a fifth valve acting as a check valve therein opening on discharge of fast rinse water therethrough, said fifth valve being pressure operated to open position by the fast rinse water acting thereon in the direction therethrough of service flow, and means connecting said timer with said inlet valve means and said second valve means for actuating the same for carrying out a service flow through said mineral bed to condition water flowing therefrom, to regenerate, backwash and slow rinse said mineral bed in a direction reverse of service flow and to reset said bed by a fast rinse therethrough in the direction of service flow.

2. A water conditioner according to claim 1 wherein said regeneration agent container has a relatively small in size bleed off drain conduit for draining same, said drain conduit being relatively small as compared with said conduit means connecting the regeneration container with the discharge conduit means leading from the mineral bed, and a check valve in said conduit means leading to discharge regeneration solution from said regeneration container to prevent reverse flow therein.

3. A water conditioner according to claim 1 wherein said regeneration agent container has said water supply conduit means connected to supply water at the bottom of the container, said conduit means connecting the regeneration agent container and the discharge conduit means leading from the mineral bed connecting with the upper portion of said regeneration agent container, said regeneration agent container has a perforated member for holding the regenerate material in spaced relation to the bottom for receiving supply water therebelow and forming a space within the bottom of the container and a relatively small bleed off drain line as compared with the supply and discharge conduits connected with the container connected with the bottom of said container for fully emptying the same after each regeneration of the mineral bed.

References Cited

UNITED STATES PATENTS

| | | | |
|---|---|---|---|
| Re. 25,979 | 3/1966 | Rose | 210—137 X |
| 1,732,702 | 10/1929 | Tannehill | 210—140 X |
| 2,241,887 | 5/1941 | Pick. | |
| 2,434,353 | 1/1943 | Edwards. | |
| 2,680,714 | 6/1954 | Carlsson et al. | 210—190 |
| 3,023,132 | 2/1962 | Diamond et al. | 134—10 |
| 3,143,500 | 8/1964 | Damgaard | 210—190 |
| 3,239,063 | 3/1966 | Lamkin | 210—140 X |

REUBEN FRIEDMAN, *Primary Examiner.*

WILLIAM I. PRICE, SAMIH N. ZAHARNA,
*Examiners.*

F. SPEAR, *Assistant Examiner.*